United States Patent [19]

Smith

[11] Patent Number: 4,956,971

[45] Date of Patent: Sep. 18, 1990

[54] SOLID PROPELLANT CANISTER LOADED MULTIPLE PULSED OR STAGED ROCKET MOTOR

[75] Inventor: Bradley W. Smith, Ogden, Utah

[73] Assignee: Morton Thiokol, Inc., Chicago, Ill.

[21] Appl. No.: 227,748

[22] Filed: Aug. 3, 1988

[51] Int. Cl.⁵ .......................... F02K 9/28; F02K 9/34
[52] U.S. Cl. ....................................... 60/245; 60/250; 60/253
[58] Field of Search ................. 60/244, 245, 250, 253, 60/256, 263

[56] References Cited

U.S. PATENT DOCUMENTS

| | | | |
|---|---|---|---|
| 3,044,255 | 7/1962 | Precoul | 60/253 |
| 3,173,249 | 3/1965 | Wiggins | 60/245 |
| 3,442,084 | 5/1969 | Dilchert et al. | 60/250 |
| 3,568,448 | 3/1971 | Webb, Jr. | 60/250 |
| 3,812,671 | 5/1974 | Burr et al. | 60/253 |
| 3,888,079 | 6/1975 | Diesinger | 60/250 |
| 4,104,878 | 8/1978 | Chase | 60/250 |
| 4,766,726 | 8/1988 | Tackett et al. | 60/250 |

FOREIGN PATENT DOCUMENTS

805938 3/1971 Canada .................................. 60/250

*Primary Examiner*—Louis J. Casaregola
*Assistant Examiner*—Timothy S. Thorpe
*Attorney, Agent, or Firm*—Gerald K. White

[57] ABSTRACT

A multi-pulse or multi-stage canister loaded solid propellant rocket motor. The canisters are prepared separately and loaded with solid propellant whereby the scrap rate may be reduced after which they are installed in a monolithic case which affords stiffness continuity over the length of the rocket motor to prevent guidance system upsetting free play. In order to reduce the complexity of installation of the membrane seal assembly for each pulse, the bulkhead therefor is manufactured integral with the case of the respective canister and becomes the forward closure thereof. For the multi-stage rocket motor, the monolithic case may be stepped and tapered, and the stages severable therefrom as they burn out by primer cord.

8 Claims, 7 Drawing Sheets

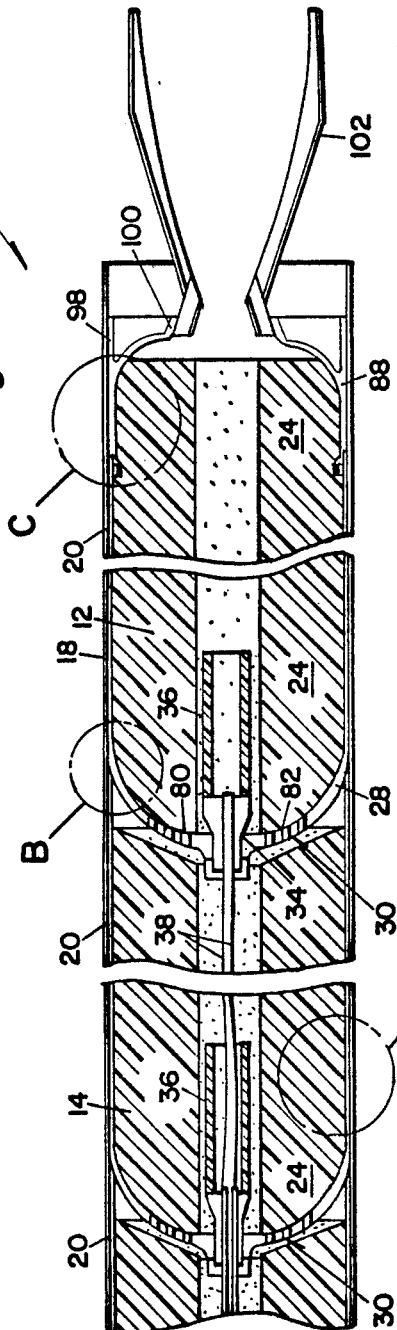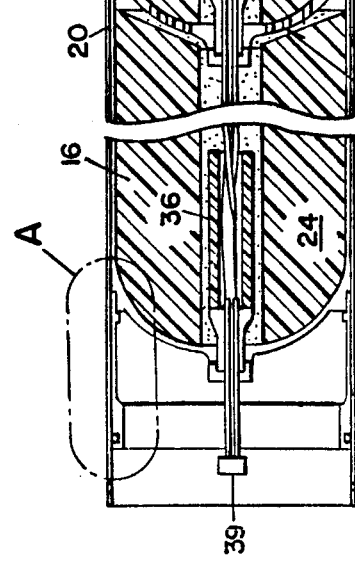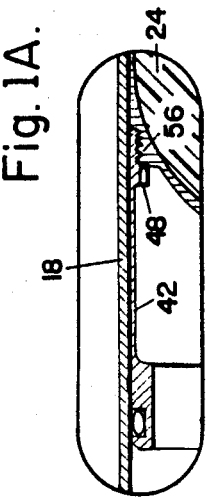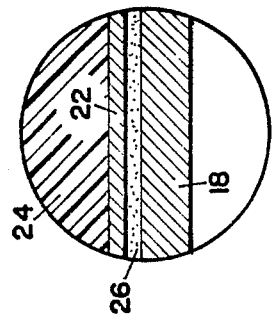

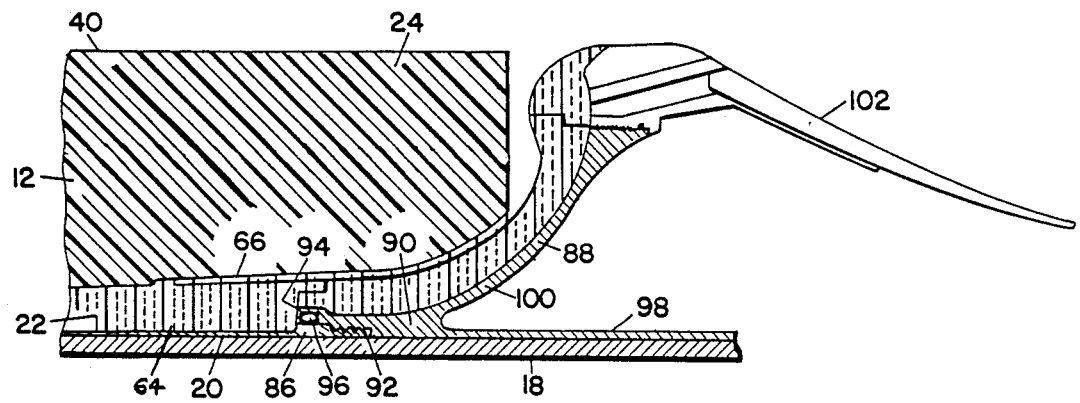
Fig. 4
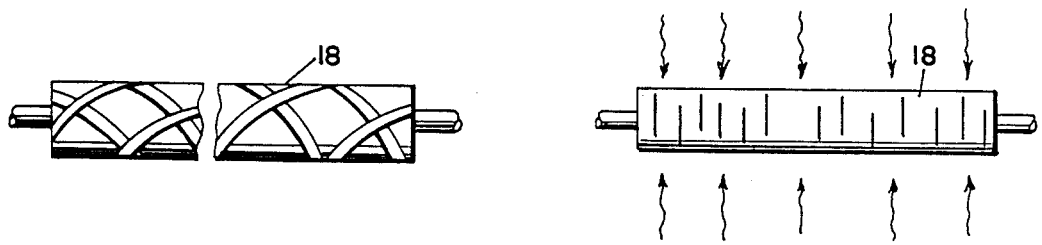
Fig. 5     Fig. 6
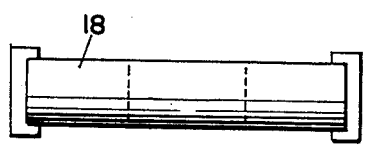  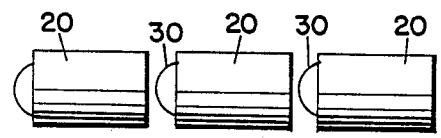
Fig. 7     Fig. 8

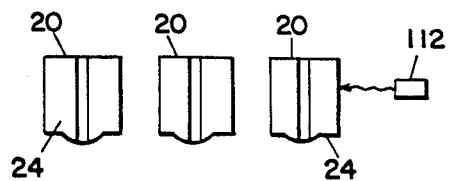
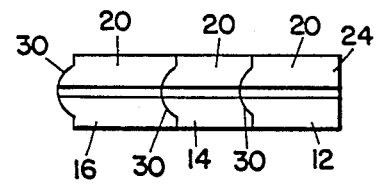
Fig. 9
Fig. 10
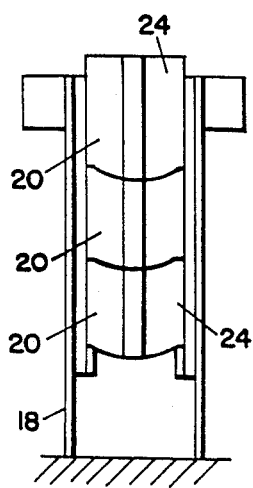
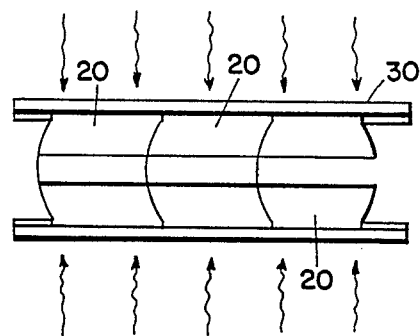
Fig. 12
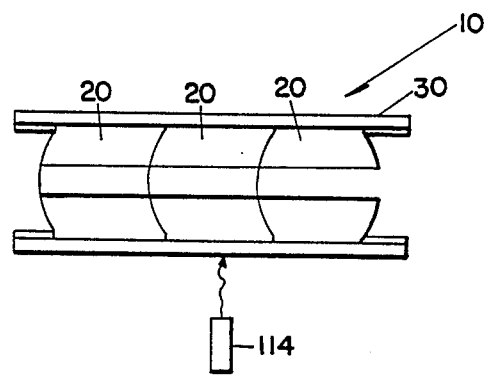
Fig. 11
Fig. 13

SOLID PROPELLANT CANISTER LOADED MULTIPLE PULSED OR STAGED ROCKET MOTOR

The present invention relates to solid propellant rocket motors.

For those rocket motors which have a single mass or grain of solid propellant, the entire propulsive capacity is usually spent during the combustion process thereof. This is for the reason that once a solid propellant grain is ignited it is very difficult to stop the combustion process until the entire mass of ignited propellant has been consumed.

In order to provide a "start-stop restart" capability so that a rocket motor will have an ability to fire more than once for greater maneuvering flexibility, solid propellant rocket motors have been provided with multiple pulses, such as described in U.S. Pat. No. 4,766,726 to Tackett et al, assigned to the assignee of the present application, and multiple stages. The aforesaid U.S. Pat. No. 4,766,726 is incorporated herein by reference. A multiple pulsed rocket motor is one which contains two or more solid propellant grains such as a boost grain and a sustain grain which are separated by a membrane seal assembly or other means to enable the ignition of the solid propellant grains to be independent of each other whereby discrete impulses are available upon command. Where the solid propellant grains are positioned in tandem with each other, that is, with one solid propellant grain forward of the other, the membrane seal assembly has extended over the inner diameter of the rocket motor case and has been attached to the rocket motor case. The membrane seal assembly includes a bulkhead which includes a plurality of apertures for flow of combustion gases therethrough and also includes a thin imperforate metallic membrane or cover of high strength but ductile material which covers the aft side of the bulkhead to seal the forward chamber from flow of gases thereinto upon ignition of the solid propellant grain in the aft chamber and which, after the solid propellant grain in the aft chamber has been expended, pressure resulting from combustion of the solid propellant grain in the forward chamber upon ignition thereof at a selected time will cause the thin membrane to rupture and thus allow the escape of gases from the forward chamber through the apertures in the bulkhead to the aft chamber and then out the nozzle to produce thrust.

A multiple staged rocket motor also provides a "start-stop-restart" capability. Like the multiple pulsed rocket motor, each stage has a separate solid propellant grain. However, a separate nozzle is provided for each grain and the grain in each stage is separated from the grains of other stages so that, when a grain has been consumed, the stage containing that grain is caused by explosive bolt means or the like to separate from the adjoining stage to thus remove excess weight from the rocket motor so that increased range and/or speed may be achieved. The adjoining stage with its separate grain and nozzle may then be fired at a selected later time during the flight of the rocket.

Pulsed and staged rocket motors have typically been provided with segmented cases to allow for separate processing of the boost and sustain propellant grains.

When a pulsed or staged segmented rocket motor is coasting and the joint is not loaded, such as during interpulse delay, the segments may have a tendency to move relative to each other. Free play or movement within the tolerance space of the connectors can undesirably upset a missile's guidance system and thus throw a missile off course.

Segmented multi-stage or multi-pulse solid propellant rocket motors are commonly pinned or bolted together with complex attachment areas which are heavy, costly to process, and may undesirably allow leaks between the stages or pulses. Furthermore, it may be difficult to reliably attach separate bulkheads to the segmented multi-pulse motor case.

It is, therefore, an object of the present invention to provide a multiple pulsed or staged solid propellant rocket motor wherein there is adequate stiffness continuity along the length of the case to insure that the missile's guidance system is not upset.

It is another object of the present invention to provide such a rocket motor which is rugged and reliable yet easy to manufacture and which allows separate processing of the propellant grains.

It is a further object of the present invention to provide such a rocket motor wherein the bulkheads are more easily and reliably provided between pulses.

These and other objects of the invention will become apparent in the following detailed description of the preferred embodiment of the invention taken in connection with the accompanying drawings.

IN THE DRAWINGS

FIG. 1 is a sectional longitudinal view of a pulsed rocket motor which embodies the present invention;

FIGS. 1A, 1B, 1C, and 1D are detail views of portions A, B, C, and D respectively of the rocket motor of FIG. 1;

FIG. 4 is a detailed view of a portion of the aft closure of the rocket motor of FIG. 1;

FIGS. 5 to 13 are schematic views illustrating steps in the manufacture of the rocket motor of FIG. 1;

DETAILED DESCRIPTION OF THE PREFERRED EMBODIMENTS

Referring to FIG. 1, there is shown generally at 10 a solid propellant rocket motor which has three solid propellant combustion chambers or pulses 12, 14, and 16. Greater details of portions of the rocket motor are shown in FIGS. 1A, 1B, 1C, 1D, and 2 to 4. For example, whereas FIG. 1, for ease of illustration, does not show insulation, it is clearly shown in FIGS. 2 to 4. In order to provide stiffness continuity along the length of the rocket motor 10 in accordance with the present invention so that the missile's guidance system may more accurately maintain the missile on course, the rocket motor 10 is provided with a monolithic elongate generally cylindrical tube or case 18 which extends generally over the entire length of the rocket motor 10. The case 18 may be composed of any suitable material such as a metallic or composite material which provides adequate strength and stiffness. For example, the case 18 may be a filament wound composite of carbon or graphite fibers, such as carbon fibers marketed by Toray Industries Inc. of Tokyo, Japan, under the designation T-40, impregnated with a polyimide resin, such as that commonly known as PMR-15, for high temperature capacity. Alternatively, for greater strength, a bis-maleimid resin may be used. The windings may, for example, be in a helical/hoop/helical/hoop/helical pattern.

In order to allow separate manufacture and processing of the solid propellant grain for each of the pulses for ease of manufacture of the rocket motor 10 in accordance with the present invention, each of the pulses 12, 14, and 16 comprises a canister 20 which may be manufactured and loaded separately and then installed in the monolithic case 18.

Figure 2:
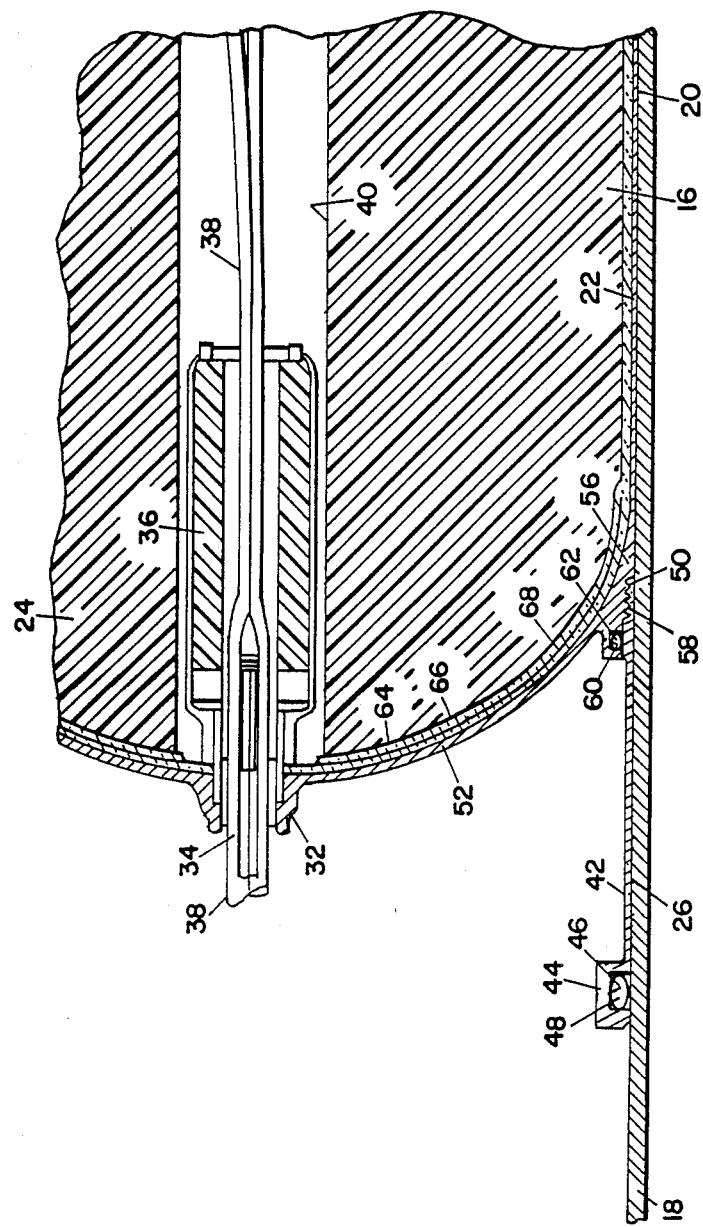
FIG. 2 is a detail view of a portion of the forward closure of the rocket motor of FIG. 1.
Figure 3:
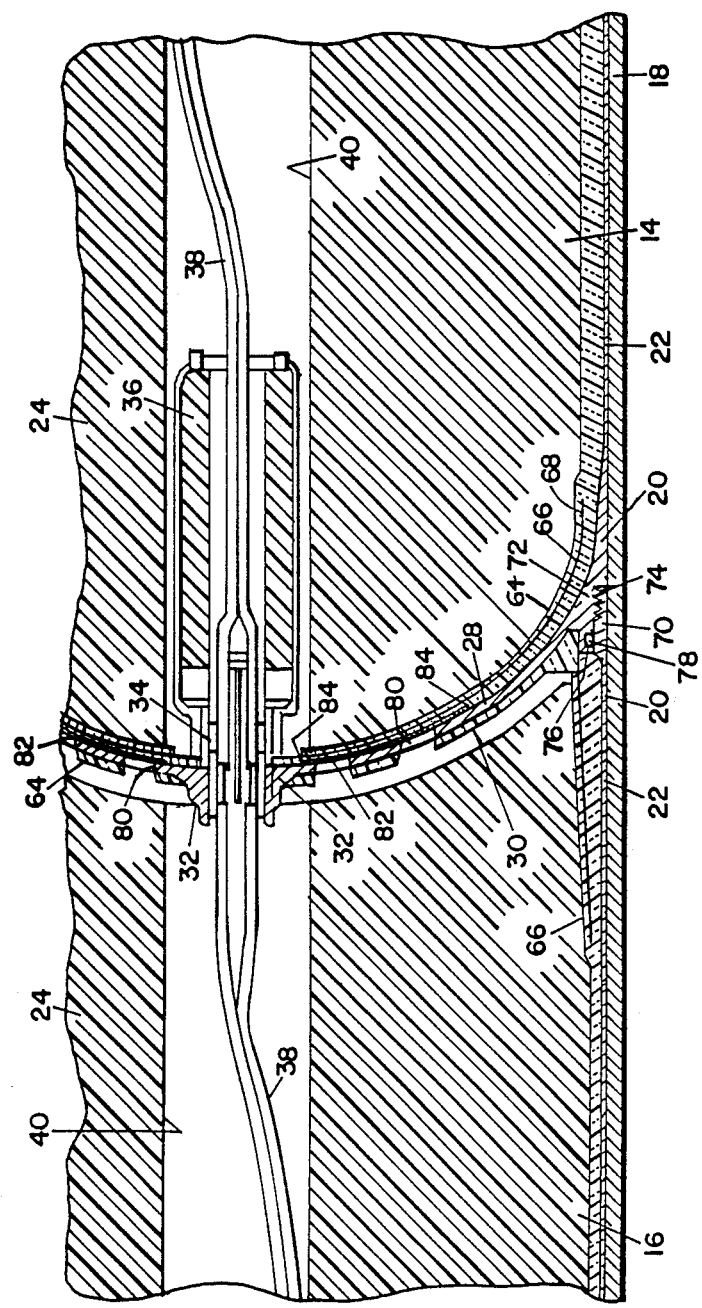
FIG. 3 is a detail view of a portion of a bulkhead pulse separator for the rocket motor of FIG. 1.

Each canister 20 comprises a thin canister wall 22, which may, for example, be composed of stainless steel such as 15-5 PH stainless steel and in which is loaded any suitable conventional propellant material, illustrated at 24, such as, for example, that commonly known as GAP propellant, i.e., a propellant containing an energy enhancing glycidal azide polymer binder. The propellant grains 24 may be centrally perforated as shown by perforations, illustrated at 40 in FIGS. 2, 3, and 4, which may be configured in any suitable conventional configuration such as star-shaped or have radial slots in accordance with the particular requirements of the rocket motor. As shown in FIGS. 2, 3, and 4, any suitable conventional insulation material 64, such as an aramid fiber impregnated rubber, is provided between the grain 24 and canister wall 22. Stress relieving flaps 66 are suitably provided by slits 68 in the insulation 64 in accordance with principles known to those of ordinary skill in the art to which this invention pertains. A suitable conventional liner (not shown) may be provided between the grain 24 and insulator 64.

The canisters 20 are inserted into the monolithic case 18 in end-to-end relation and are attached to each other as hereinafter described. Each of the canisters 20 is attached or otherwise suitably bonded to the monolithic case 18 by a suitable bonding material 26 such as, for example, an epoxy marketed by Armstrong World Industries, Inc. of Lancaster, Pa., under the designation A661 less glass filler material, having a thickness of perhaps 0.03 inch. The cure temperature of the bonding material 26 should be lower than the sensitivity of the propellant and sufficiently low so as not to degrade the bondlines of the propellant to the insulation, i.e., the cure temperature is preferably not over about 200° F.

Each pair of canisters is separated by a domed closure member or bulkhead illustrated at 28, which may for example be composed of stainless steel such as 15-5 PH stainless steel which will be described in greater detail hereinafter. The bulkhead is part of a membrane seal assembly 30. The membrane seal assembly 30 includes a through bulkhead fitting or boss 32 (see FIG. 3) in which is sealingly inserted an assembly for positioning a suitable igniter 36 such as, for example, a consumable pyrogen igniter aft of the bulkhead 28 for igniting the grain 24 in the canister 20 associated with the membrane seal assembly 30, i.e., the grain aft of the membrane seal assembly. A suitable initiator 34, which is connected via connector 39 to a source (not shown) of electrical energy by suitable leads 38, such as fiber optic leads, which are routed thereto from forwardly of the rocket motor 10 through the central apertures or perforations 40 in the grains 24 which are in the canister or canisters 20 forward thereof in a conventional manner as shown. The igniter assembly is sealed in the feed-through boss 32 by a suitable seal such as a glass to metal seal or an epoxy to prevent escape of gases therethrough. Such a seal may be provided using principles of common knowledge to those of ordinary skill in the art to which this invention pertains, and may be provided similarly as described in the aforesaid U.S. Pat. No. 4,766,726.

Referring to FIG. 2, there is shown a detailed view of a portion of the forward closure. A generally cylindrical stub skirt 42 composed of a suitable material such as 15-5 PH stainless steel and having a thickness of perhaps 0.03 inch is inserted in the upper or forward end portion of the case 18 is bonded thereto by bonding material 26 to increase bond area for reacting the dome loads into the case 18. The stub skirt 42 has an enlarged forward portion 44 which contains a circumferential groove 46 in its radially outer surface which faces the case 18. In the groove 46 may be contained an O-ring 48 to provide a wiper seal to provide a vacuum to draw in the bonding material 26 as the assembly of canisters are loaded into the case 18. Alternately, the bonding material may be injected between the case 18 and canisters 20 under pressure in which case the wiper seal is not needed. The aft end portion 50 of the stub skirt is enlarged, and the enlarged portion 50 is threaded.

The canister 20 for the forward or third pulse 16 is composed of stainless steel such as 15-5 PH stainless steel or other suitable material and has the aforesaid generally cylindrical wall 22 with a thickness of perhaps 0.03 inch which is integral with a forward dome portion 52 which has an enlarged thickness of perhaps 0.090 inch to withstand longitudinal loads to form the forward closure. at the intersection of the generally cylindrical wall 22 and the dome 52 is an enlarged portion 56 which is threaded to mate with threads on the threaded portion 50 of the stub skirt 42 to provide a threaded joint illustrated at 58 between the canister 20 for the third pulse 16 and the stub skirt 42. The enlarged portion 56 also has a groove 60 in a radially outer surface thereof facing the stub skirt aft portion 50 in which is inserted an O-ring 62 to provide a seal against escape of gases forwardly of the the third pulse 16. Centrally of the dome 52 is a feed-through boss 32, as previously described, for sealingly inserting the initiator/igniter assembly for the third pulse 16.

A more detailed view of a portion of the membrane seal assembly 30 between two pulses, i.e., pulses 14 and 16, is shown in FIG. 3, the membrane seal assembly between pulses 12 and 14 being similar. For the purposes of description of FIG. 3, pulse 16 will be called the forward pulse and pulse 14 will be called the aft pulse. The canister 20 for the forward pulse 16 terminates at its afte end in an enlarged end portion 70 which is threaded similarly to the end portion 50 of the stub skirt 42. The canister 20 for the aft pulse 14, which is also composed of 15-5 PH stainless steel or other suitable material, has the wall 22 as previously described with a thickness of perhaps 0.03 inch and a dome shaped bulkhead 28 integral therewith which has a greater thickness of perhaps 0.09 inch to withstand longitudinal loads to form a closure between the forward and aft pulses 16 and 14 respectively. If a canister 20 for a pulse, other than the forward pulse, is composed of a composite material, the bulkhead 28 therefor may comprise thin stainless steel bonded inside of the domed portion of the canister for attachment of the membrane 82. A canister is preferably composed of thin stainless steel or other suitable metal in order that the assembly of the membrane seal assembly 30 may be easier.

At the intersection of the wall 22 and bulkhead 28 is an enlarged portion 72, similar to enlarged portion 56 in FIG. 2, which is threaded to mate with threads on the forward canister aft portion 70 to provide a threaded joint illustrated at 74 therebetween. Enlarged portion 72 includes a groove 76 in its radially outer surface facing the canister end portion 70 in which is inserted an O-ring 78 to seal between the second and third pulses 14 and 16 respectively.

In order to provide a flow of gases through the bulkhead 28 into the canister 20 for the aft pulse 14 so that they may be expelled through the nozzle during burning of the propellant grain 24 in the canister 20 for the forward pulse 16, a plurality of apertures 80 are contained in the bulkhead 28. Apertures 80 are preferably of a sufficient size and quantity to provide a flow area therethrough which is equal to approximately four times the nozzle area so as to minimize pressure drop therethrough but which are also preferably positioned to provide maximum material strength in accordance with principles commonly known to those of ordinary skill in the art to which this invention pertains. A thin metallic burst diaphragm 82 composed of any suitable material such as, for example, stainless steel or nickel is provided along the aft surface of the bulkhead 28 and is bonded thereto by any suitable means such as, for example, welds illustrated at 84 to prevent the flow of gases through the apertures 80 while the propellant grain 24 in the canister 20 for the aft pulse 14 is burning but which is caused to rupture to allow the passage of gases through the apertures 80 after the aft pulse grain 24 has completed burning and during burning of the propellant grain in the canister 20 for the forward pulse 16. In other words, the diaphragm 82 is caused to rupture to provide flow communication through the apertures 80 between a pair of adjacent canisters 20 when a higher pressure is present in the forward one of the canisters than in the after one of the canisters. The burst diaphragm 82 may be scored as discussed in the aforesaid patent application which is to issue as U.S. Pat. No. 4,766,726 to rupture easily and predictably upon a pressure in the forward canister 16 exceeding the pressure in the aft canister 14 by a substantial amount. Centrally of the bulkhead 28 is a feed-through boss 32 integral therewith to permit insertion and positioning of the igniter assembly for ignition of the respective propellant grain 24 aft of the bulkhead 28, as previously discussed with respect to the forward closure of FIG. 2. Insulation 64 is provided between the grain 24 and the bulkhead 28 as well as between the grain 24 and the wall 22 for the canister 20 for the aft pulse 14, the insulation next to the bulkhead being provided with a stress relieving flap 66. In the canister 20 for the forward pulse 16, insulation 64 is provided to cover the bulkhead 28 leaving the apertures 80 uncovered, and the aft end portion of the insulation along the cannister wall 22 is provided with a flap 66, as shown in FIG. 3.

Referring to FIG. 4, there is shown a portion of the aft closure of the rocket motor 10. The canister 20 for the first pulse 12 extends aftwardly to terminate, similarly to the canister for the third pulse 16, in an enlarged threaded portion 86. An aft closure member 88 has an enlarged threaded portion 90 to threadedly mate with the canister threaded portion 86 to provide a threaded joint illustrated at 92 therebetween. A groove 94 is provided in the radially outer surface of the enlarged portion 90 facing the canister portion 86, and an O-ring 96 is provided in the groove 94 to provide a seal against escape of gases between the aft closure member 88 and the canister 20. A generally cylindrical portion 98 of the aft closure member 88 extends rearwardly from the enlarged portion 90 and is suitably bonded with bonding material 26 to the case 18. A dome shaped portion 100 of the aft closure member 88 extends rearwardly and inwardly from the enlarged portion 90 to provide means for attachment of nozzle 102 in accordance with principles commonly known to those of ordinary skill in the art to which this invention pertains. The nozzle throat may be composed of tungsten or of rhenium coated carbone graphite to reduce throat erosion for consistent performance. Insulation 64, which may be provided with a suitable relief flap 66 in the area of the threaded joint 92, is caused to cover the inner surfaces of the canister wall 22, the aft closure member 88, and the axially inner surface of the nozzle 102.

Each canister 20 is manufactured and loaded with a grain 24 separately. The loaded canisters 20 are then assembled together by means of the threaded joints 74, as previously discussed, or other suitable means. The aft closure member 88 is attached to the aft canister 20 by means of threaded joint 92, as previously discussed, or other suitable means. The stub skirt 42 is attached to the forward canister 20 by means of the threaded joint 58 as previously discussed, or by other suitable means. This assembly is then inserted in and bonded into the monolithic case 18 which is the primary load carrying structure.

FIGS. 5 to 13 illustrate in sequence the manufacture of a rocket motor according to the present invention. After the monolithic case 18 has been filament wound by a suitable filament winding process, as illustrated in FIG. 5, it is suitably cured at an elevated temperature of perhaps 600° F. at 150 psi for a period of perhaps 9 hours in an autoclave, as illustrated in FIG. 6. The mandrel is then removed, and the case hydroproofed and any domes removed, as illustrated in FIG. 7. In the case 18 is produced by a continuous braider, then the case 18, of the desired length, is cut therefrom. The canisters 20 are fabricated, as illustrated in FIG. 8, either before, after, or while the case 18 is made, loaded with solid propellant grains 24 and inspected by use of suitable inspection apparatus 112, as illustrated in FIG. 9, and then assembled together, as illustrated in FIG. 10 and as previously discussed. As also previously discussed, the stub skirt 42 and aft closure member 88 are also attached. The assembled canisters are then inserted in the monolithic case 18 and bonded thereto, as illustrated in FIG. 11, by pumping the low cure temperature bonding material 26 between the canister walls 22 and the case 18 under pressure and curing it, as illustrated in FIG. 12. The bond may be inspected by suitable inspection apparatus 114 as illustrated in FIG. 13 after which the bond may be proof tested with inert gas. The nozzle 102 may then be installed.

For example, the monolithic case 18 may have a length of about 82 inches, a diameter of about 8 inches, and a thickness of about 0.12 inch and have three pulses the canister 20 for each having a length of about 23 inches and a thickness of about 0.03 inch. The case 18 may, for example, be a filament wound composite of resin impregnated carbon or graphite fibers, as previously discussed, while each of the canisters may, for example, be composed of 15-5 PH stainless steel and be loaded with a conventional propellant material including a conventional insulator and liner, as previously discussed. The nozzle throat may, for example, have a diameter of about 1.34 inches.

Figure 14:
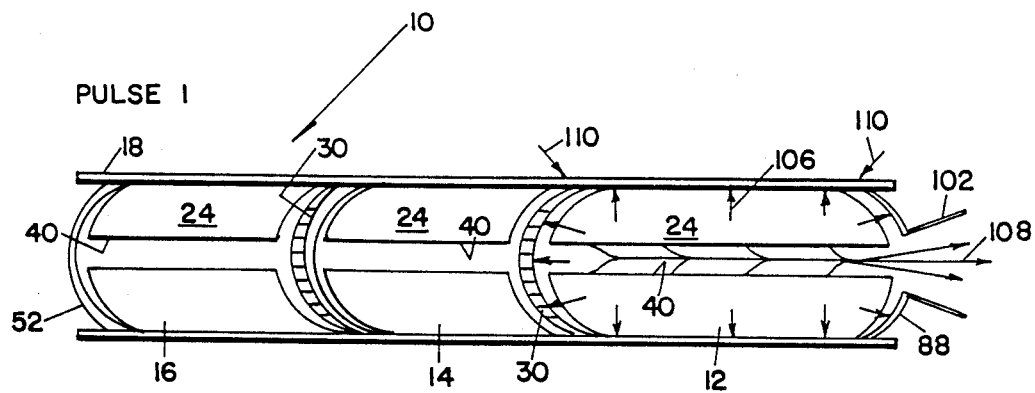
FIGS. 14 to 16 are schematic longitudinal views which illustrate in sequence the operation of the rocket motor of FIG. 1.
Figure 15:
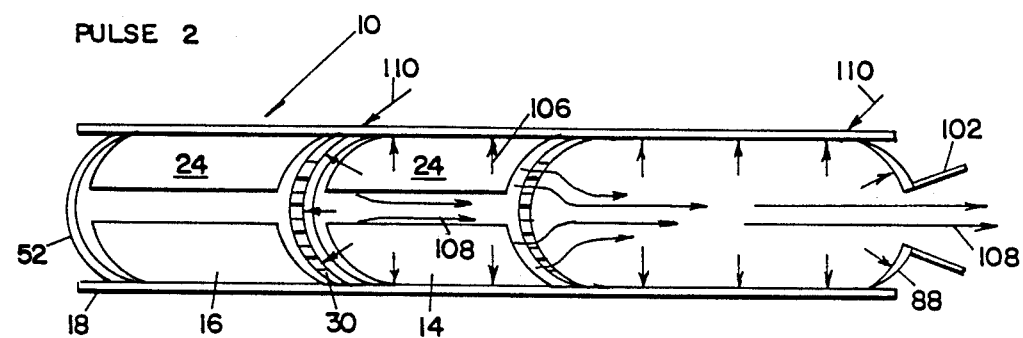
Figure 16:
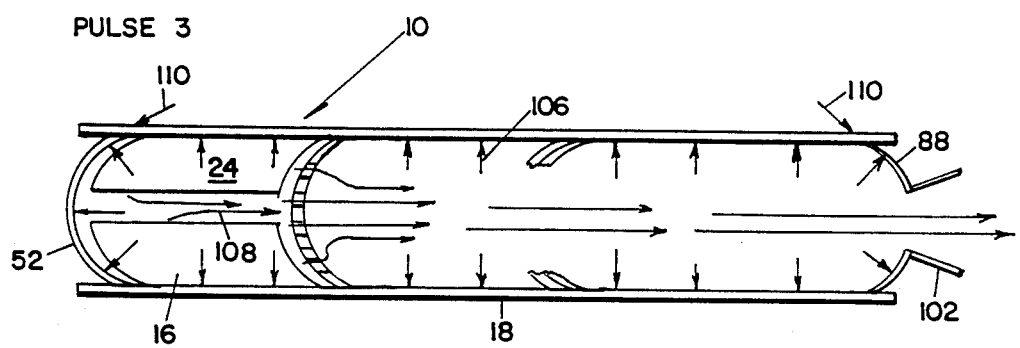

FIGS. 14 to 16 illustrate in sequence the operation of rocket motor 10 of FIG. 1. The arrows 106 illustrate internal pressure due to combustion of the propellant material 24. The arrows 108 illustrate the flow of gases generated from burning of the propellant grains 24. The arrows 110 ilustrate the points where the longitudinal load from closures react through the bond line into the case 18. The rocket motor 10 is initially operated by providing power to the initiator 34 through leads 38 to ignite the igniter 36 for the first pulse 12 to ignite the solid propellant grain 24 in the canister 20 for the first pulse 12, as illustrated in FIG. 14. The internal pressure 106 is contained within the canister 20 for the first pulse 12 and the gases which are produced are released through the nozzle 102 to produce thrust for forward movement of the rocket motor. The bulkhead 28, with the apertures 80 therein covered by the burst diaphragm 82, prevent the passage of gases into the canisters 20 for the second and third pulses 14 and 16 respectively.

After the first pulse has been extinguished, the solid propellant grain 24 for the second pulse 14 may be ignited at a selected time. When it is ignited, the pressure of the gases generated therefrom burst the diaphragm 82 between the first and second pulses 12 and 14 respectively and pass through the apertures 80 thereof into the canister 20 for the first pulse 12 and are then released through the nozzle 102 to produce thrust, as illustrated in FIG. 15. The bulkhead 28 and burst diaphragm 82 which separate the second and third pulses 14 and 16 respectively prevent the passage of the generated gases into the canister 20 for the third pulse 16.

As illustrated in FIG. 16, the bulkhead 28 and burst diaphragm 82 between the first and second pulses 12 and 14 respectively are substantially consumed during the second pulse. After the second pulse has been extinguished, the solid propellant grain 24 for the third pulse 16 may be ignited at a selected time. The pressure generated by the gases from burning the grain 24 for the third pulse 16 burst the diaphragm 82 between the second and third pulses 14 and 16 respectively and pass through the apertures 80 in the bulkhead therebetween after which they are passed through the first and second pulse canisters then through the nozzle 102 to provide thrust.

Figure 17:
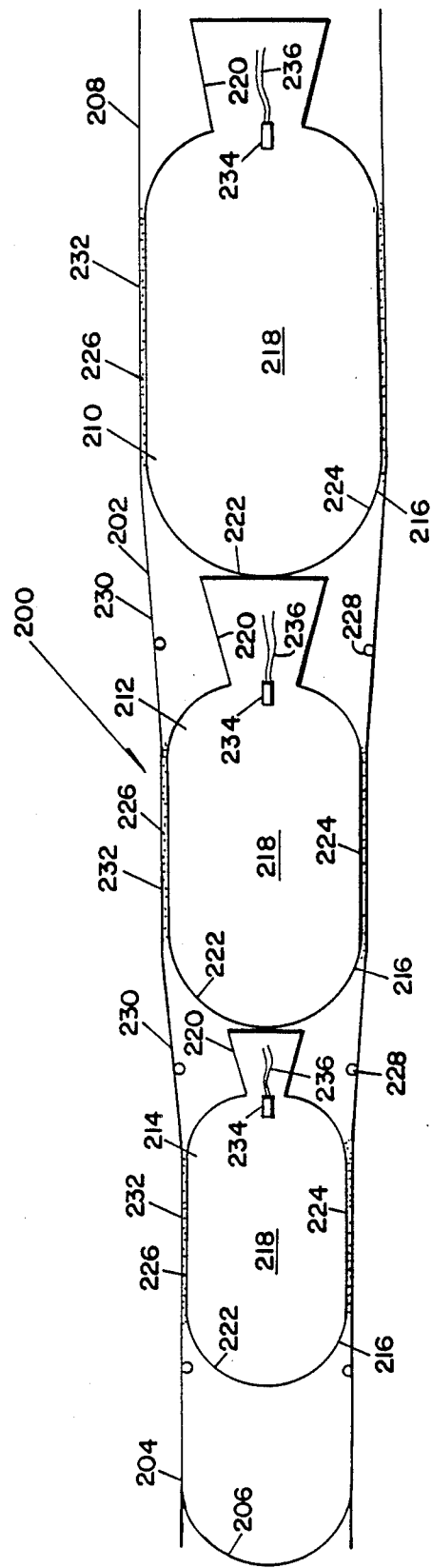
FIG. 17 is a schematic longitudinal view of a multiple staged rocket motor which embodies the present invention.

Referring to FIG. 17, there is schematically shown generally at 200 a rocket motor in accordance with an alternative embodiment of the present invention. The rocket motor 200 comprises a monolithic case 202, which may be composed of any suitable material such as stainless steel or carbon or graphite fiber and resin composite material similarly as described for the case 18 of FIG. 1, which is closed at its forward end 204 such as by a domed structure 206 and is open at its aft end 208. Contained within the monolithic case 202 in end-to-end relation is a plurality of stages 210, 212, and 214 each of which comprises a canister 216 loaded with a suitable conventional solid propellant illustrated at 218 and a nozzle 220 attached to the canister 216 at its aft end for expelling gases from combustion of the propellant 218 for providing thrust.

Each of the canisters 216 has a generally dome-shaped closed integral forward end portion 222 which is suitably reinforced such as by increased wall thickness to prevent escape of population gases forward thereof to other stages.

The case 224 of each canister may be composed of any suitable material such as an insulation material overwrapped with carbon fiber/epoxy composite. Shrink flaps have been conventionally used between the case and insulator of conventional rocket motors to prevent cracking or debonding of the propellant from the insulator. In order to eliminate bondline problems caused by propellant shrinkage without the need to provide such shrink flaps between the case and insulator, it is preferred that the canister case 224 be composed of a transversely (transverse to the fiber direction) elastomeric reinforcing material such as a composite of a resin impregnated continuous fiber such as aramid oriented at a low angle such as less than 15 degrees relative to the case axis coated with rubber or other suitable elastomeric material and polar wound to form the canister case. The polar windings may be compacted by any suitable means such as curing in a female mold. If hoop windings are applied for compacting, they should be removed afterwards to allow for contraction and expansion. Other suitable fibrous material such as carbon or graphite fibers or fiberglass material may alternately be used. If desired, the canister case 224 may be composed of thin stainless steel or other metal with insulation material applied internally thereof. The insulation may be a rigid rubber or otherwise sufficiently rigid for the nozzle 220 to be attached directly in a manner and using principles commonly known to those of ordinary skill in the art to which this invention pertains. Alternatively, a polar boss (not shown) may be attached to the canister case 224, and the nozzle 220 attached to the polar boss. The case 224 is preferably cured in a female mold to provide a suitable surface of bonding into the monolithic case 202. Propellant material 218 is preferably cast therein while in the same mold to prevent its contamination with hydroscopic moisture from the air.

In order to allow increased grain configuration flexibility for tailoring of the burn rate pattern and to provide ease of core removal after the propellant is cast, propellant material 218 in the canister 216 may desirably be segmented and the segments suitably individually bonded or otherwise attached in the canister case 202 in accordance with principles commonly known to those of ordinary skill in the art to which this invention pertains.

Each of the canister cases 224 is preferably bonded or otherwise suitably attached to the monolithic case 202, with the aid of a conventional retainer (not shown) which fits in a groove of the case 202 to lock the canister therein, using a room temperature cured epoxy, illustrated at 226, such as a versamide or tetro-amine cured epoxy so as not to unduly heat the propellant. Alternatively, the canister cases 224 may be pinned or screwed, such as by a modified buttress thread, into the monolithic case 202. In order to allow wedging of the canister cases 224 in the monolithic case 202 so that they are seated in place for a tight fit during acceleration of the rocket motor 200 so that a case 224 is not "rammed" into a case forward thereof, the portions 230 of the monolithic case 202 to which the individual canister cases 224 are not bonded, i.e., the interstage portions, are tapered so that the case 202 has a smaller diameter at its forward end 204 than at its aft end 208, and the diameters of the canister cases 224 are accordingly decreased from the aft canister to the forward canister. However, the portions 232 of the monolithic case 202 to which the individual canister cases are bonded are stepped, i.e., not tapered, to prevent the necessity of having to also taper the canister cases 224. Servicing access ports (not shown) for final connections of conventional vector control and electrical devices may be cut through interstage portions 230 of the monolithic case 202.

In accordance with the present invention, suitable means are provided for severing the monolithic case 202 to release each of the canisters 216 in turn after the solid propellant material 218 therein is burned. Such means preferably comprises primer cord 228, that is, a fast burning longitudinal explosive such as a putty or disc igniterant for cutting, which is preferably bonded along the inner surface of the monolithic case 202 circumferentially thereof between each pair of canisters 216, i.e., in each of the tapered interstage portions 230. At a selected time, the primer cord 228 is ignited to sever the monolithic case 202 so that the stage aft thereof is released from the rocket motor.

The monolithic case 202 and canisters 216 are constructed separately. After each canister case 224 has been constructed it is loaded with solid propellant 218 and a nozzle 220 is attached as previously discussed. Each of the canisters 216 is then inserted in turn in the monolithic case 202 and bonded to the respective stepped portion 232 thereof. The primer cord 228 is bonded about the circumference along the inner surface of each interstage portion 230 after the respective canisters 216 forward thereof have been installed.

A conventional igniter illustrated schematically at 234, which may include a suitable initiator, is provided for igniting the solid propellant grain 218 in each of the canisters 216. Each igniter 234 is connected by lead wires 236 to a source of power (not shown).

Operation of the rocket motor 200 is initiated by supplying power through lead wires 236 to the igniter 234 for the canister 216 for the first stage 210. The igniter 234 is caused to ignite the propellant 218 in the first stage 210 whereby the propellant burns to produce gases which are expelled through the nozzle 220 for the first stage 210 to provide thrust for forward movement of the rocket motor. After it has burned out, the first stage 210 is removed from the rocket motor 200 by igniting the primer cord 228 in the interstage portion 230 between the first and second stages 210 and 212 respectively to sever the monolithic case 202. At a selected time during the flight of the rocket motor 200, the second stage 212 is ignited similarly to the ignition of the first stage to produce thrust. After the second stage is burned out it is severed from the rocket motor similarly to the severing of the first stage therefrom. At another selected time during the flight, the third stage 214 is ignited to produce additional thrust for carrying the rocket to its destination.

Alternately, the monolithic case may be only slightly tapered over its length to permit wedging of cylindrical canisters therein. If desired, the loaded canisters may be frozen or suitably lowered in temperature then loaded upside down in the monolithic case so as to expand and form a tight fit therewith as they warm to ambient temperature with a result that it may be unnecessary to taper the monolithic case at all. A suitable bonding agent or mechanical interlock may also be provided in addition to the tight fit to provide positive load transfer. If the monolithic case is composed of a material such as a carbon or graphite fiber material providing a negative or only a small positive coefficient of thermal expansion, the case may be loaded with the canisters while it also at the lower temperature whereby the canisters may expand more than the case expands during warming to ambient temperature to form the tight fit.

The monolithic case 18 or 202 is provided to have sufficient strength and stiffness to carry longitudinal and hoop loads due to internal pressure as well as external loads due to flight environments or handling. Thus, the monolithic case 18 or 202 is provided to function as a stress, stiffening, and attachment complement to the pulses 12, 14, and 16 or stages 210, 212, and 214 to eliminate indesirable free play along the length of the rocket motor and allow the canisters 20 or 216 to have thinner walls as previously discussed since they need not be built to assume the stresses and stiffening which are assumed by the monolithic case 18 or 202. Since only pulses or stages and not an entire motor need be scrapped, the present invention allows reduced scrap. Since rocket motor 10 or 200 does not require complex case joint ring assemblies, cost, weight, inert volume, and required hardware may be advantageously reduced. Furthermore, a rocket motor according to the present invention may require little or no "blind hole" fabrication. The monolithic case of the present invention may be fabricated inexpensively and easily since it does not require any domes, polar bosses, skirts, shear plies, or joints. The monolithic case 18 is also provided to simplify the membrane seal assembly 30 construction wherein the bulkhead thereof may be integral with the canister wall and thus more reliably form the forward closure for each canister.

It is to be understood that the invention is by no means limited to the specific embodiments which have been illustrated and described herein and that various modifications thereof may indeed be made which come within the scope of the present invention as defined by the appended claims.

What is claimed is:

1. A rocket motor comprising a monolithic elongate generally cylindrical case having means defining an aft aperture, at least two canisters each of which has an individual case and contains an individual grain of solid propellant material, said canisters disposed sequentially within said monolithic case in end to end relation with said canister cases attached to said monolithic case and to each other, means forming a closure to preclude flow communication between said canisters which includes means providing flow communication between said canisters when a higher pressure is present in the forward one of said canisters than in the aft one of said canisters, means for igniting each of said solid propellant grains, and a thrust nozzle means attached to said monolithic case in flow communication with said aft aperture.

2. A rocket motor according to claim 1 wherein said closure means comprises a bulkhead for providing a forward closure of the aft one of said canisters, said bulkhead including a plurality of perforation means for providing flow communication between said canisters, and a rupturable membrane seal means covering said perforation means to preclude flow communication between said canisters and to rupture and thereby allow flow communication between said canisters when a higher pressure is present in the forward one of said canisters then in the aft one of said canisters.

3. A rocket motor according to claim 2 wherein said bulkhead is integral with said aft canister case.

4. A rocket motor according to claim 1 wherein said individual canister case are bonded to said monolithic case.

5. A method of making a rocket motor comprising the steps of:
   a. providing a monolithic elongate generally cylindrical case having an aft aperture;
   b. providing at least two canisters each having an individual case and containing an individual grain of solid propellant material;
   c. providing a closure on an end portion of one of the canisters to be attached to an open end portion of the other of the canisters to preclude flow communication between the canisters when they are connected together in end to end relation;
   d. providing means for providing flow communication between the canisters when a higher pressure is present in said other canister then in said one canister;
   e. connecting said end portion of said one of the canisters to said open end portion of said other of the canisters;
   f. inserting the connected canisters in the monolithic case;
   g. attaching the individual canister cases of the connected canisters to the monolithic case; and
   h. attaching a thrust nozzle to the monolithic case in flow communication with the aft aperture.

6. A method according to claim 5 wherein the step of providing a closure comprises providing a bulkhead which closes said end portion of said one of the canisters, the step of providing flow communication means comprises providing a plurality of perforations in the bulkhead and covering the perforations with a membrane which precludes flow communication between the canisters and which ruptures and thereby allows flow communication between the canisters when a higher pressure is present in said other of the canisters than in said one of the canisters.

7. A method according to claim 6 further comprising forming the bulkhead integral with the case of said one of the canisters.

8. A method according to claim 5 wherein the step of attaching said individual canister cases to the monolithic case comprises bonding said individual canister cases to the monolithic case.

* * * * *